(12) United States Patent
Vasilantone

(10) Patent No.: US 8,516,990 B1
(45) Date of Patent: Aug. 27, 2013

(54) HYBRID ROTARY ENGINE

(76) Inventor: Michael M. Vasilantone, Lakewood, NJ (US)

( * ) Notice: Subject to any disclaimer, the term of this patent is extended or adjusted under 35 U.S.C. 154(b) by 0 days.

(21) Appl. No.: 13/507,624

(22) Filed: Jul. 16, 2012

(51) Int. Cl.
*F02B 53/00* (2006.01)
(52) U.S. Cl.
USPC ............... 123/243; 60/698; 60/716; 60/720
(58) Field of Classification Search
USPC ................... 60/698, 716, 719, 720; 123/241, 123/243
See application file for complete search history.

(56) References Cited

U.S. PATENT DOCUMENTS

| | | | | |
|---|---|---|---|---|
| 3,852,963 A * | 12/1974 | Hufstader | ....................... | 60/717 |
| 3,869,863 A * | 3/1975 | Juge | .............................. | 60/39.19 |
| 3,971,347 A * | 7/1976 | Vasilantone | .................. | 418/147 |
| 4,307,695 A * | 12/1981 | Vasilantone | ............... | 123/559.1 |
| 4,742,683 A * | 5/1988 | Heminghous et al. | .......... | 60/716 |
| 5,161,378 A * | 11/1992 | Murray et al. | .................. | 60/718 |
| 6,698,395 B1 * | 3/2004 | Vasilantone | .................. | 123/243 |

\* cited by examiner

*Primary Examiner* — Hoang Nguyen
(74) *Attorney, Agent, or Firm* — Clifford G. Frayne

(57) ABSTRACT

A hybrid engine including a set of sequencing generators, an electric motor, and a rotary internal combustion engine, including pivotal vane elements mounted on a rotor and biased into engagement to sequentially form intake, compression, combustion and exhaust chambers between the rotor and its housings annular inner wall.

6 Claims, 8 Drawing Sheets

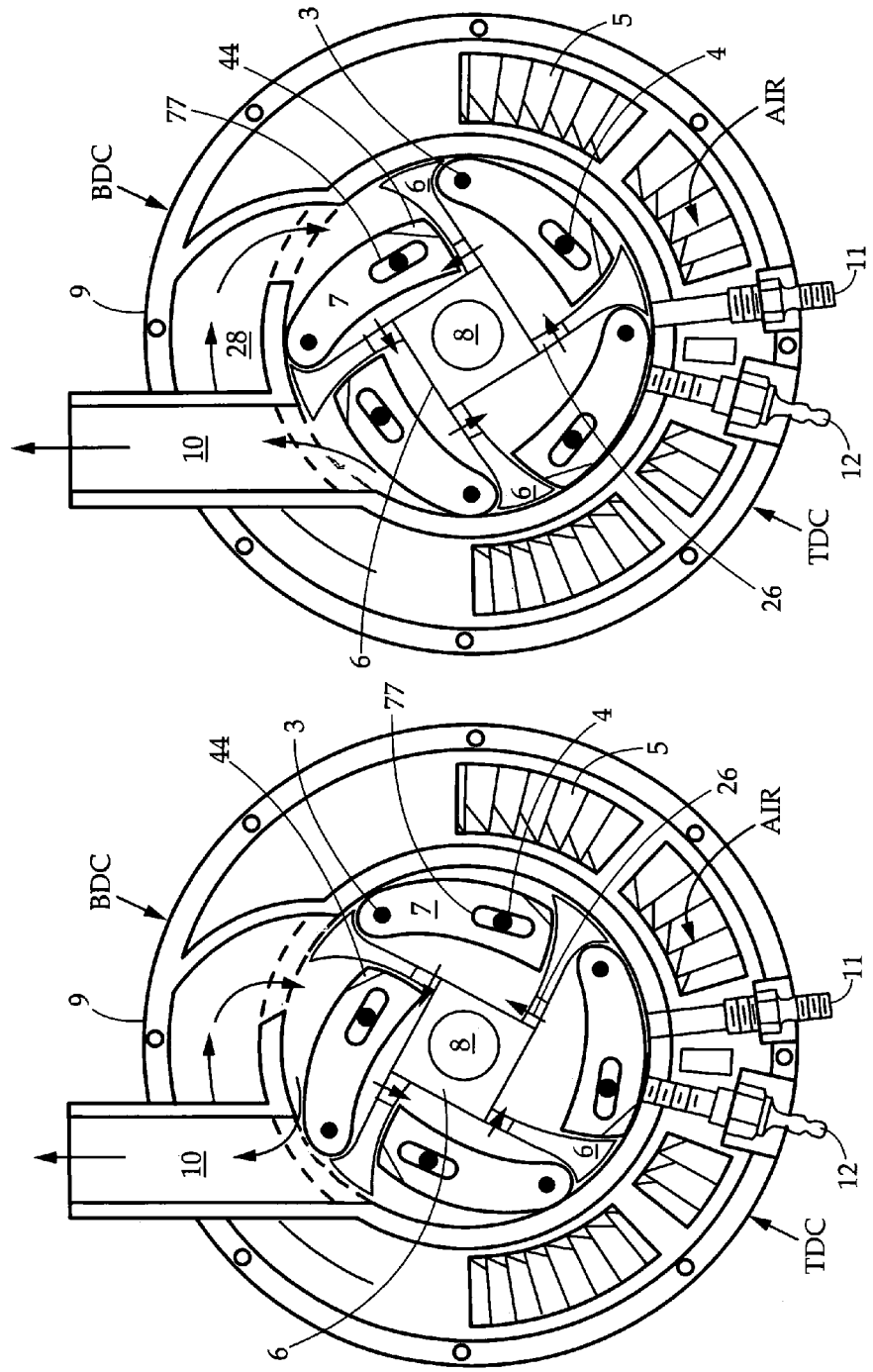

HYBRID ROTARY ENGINE

BACKGROUND OF THE INVENTION

1. Field of the Invention

The present invention relates to hybrid engines combining electric motors and generators with combustion engines, in general, and to a hybrid engine in which the electric motor and a set of sequencing generators are combined with a rotary internal combustion engine.

2. Description of the Prior Art

As is well known and understood, automotive manufacturers are either producing or developing automobiles with reciprocating piston engines which combine electrical power with internal combustion engines. In these hybrid designs, the generator constantly charges the vehicles batteries, while increasing revolutions during moments of deceleration which increases the charges to the batteries.

As will become clear from the following description, the present invention provides a hybrid engine which combines an electric motor and a set of generators with a rotary internal combustion engine. As will be seen more specifically, the hybrid engine utilizes a rotary internal combustion engine which incorporates features of my prior U.S. Pat. Nos. 3,971,347, 4,307,695, and 6,698,395, but with improved efficiency.

As is known, the main benefits to be derived from rotary internal combustion engines relative to reciprocating piston engines are that they are comprised of fewer operating parts, can be run on a number of different fuels, and are more compact and more efficient.

My U.S. Pat. No. 3,971,347 describes a rotary internal combustion engine housing and a concentrically arranged chamber within the housing in receiving an eccentrically disposed cylindrical rotor; the rotor cooperates with the chamber to define a crescent-shaped chamber which is sequentially divided into intake, compression, combustion, and exhaust chambers by means of vanes which are pivotally mounted on the annular surface of the rotor and which engage the inner surface of the housing in defining the chamber. The resulting configuration provides efficiency of operation, effective sealing between the rotor and the housing, effective minimalization of heat build up due to frictional contact, and a great rigidity and strength.

My U.S. Pat. No. 4,307,695 provides enhanced operation by having a blower and/or supercharger that are driven by the rotary engine. The design includes a rotor, a plurality of piston vanes angularly mounted in the rotor, an actuator cage mounted for eccentric rotation relative to the axis of rotation of the rotor, a blower, a transverse actuator pin connecting each piston vane to the actuator, and a plurality of fixed pins connecting the rotor to the actuator. With the fixed pins mounted on the actuator disks so as to pass through clearance holes in the fan disks which mate with bearings mounted in the actuator disks, rotation of the rotor causes rotation of the actuator pins, fan disks and of the actuator cage as well.

OBJECTS OF THE INVENTION

An object of the present invention is to provide for a novel hybrid engine comprised of a set of electric generators, an electric motor, and a rotary internal combustion engine.

A further object of the present invention is to provide for a novel hybrid engine wherein the rotary internal combustion engine is comprised of a plurality of pivotal vanes, the pivoting of which define the phases of the combustion.

SUMMARY OF THE INVENTION

A hybrid engine including a set of sequencing generators, an electric motor, and a rotary internal combustion engine, including pivotal vane elements mounted on a rotor and biased into engagement to sequentially form intake, compression, combustion and exhaust chambers between the rotor and its housings annular inner wall.

BRIEF DESCRIPTION OF THE DRAWINGS

These and other objects of the present invention will become apparent particularly when taken in light of the following illustrations wherein:

FIG. 6 is a sectional view of the engine of FIG. 1 with its vanes in the four phases of intake, compression, combustion and exhaust, while the intake vane is in the purging mode, and the combustion vane is at top dead center (TDC);

FIG. 7 is a sectional view of the engine with the intake vane at bottom dead center (BDC) while a combustion vane proceeds through its power phase.

DETAILED DESCRIPTION OF THE DRAWINGS

Figure 1:
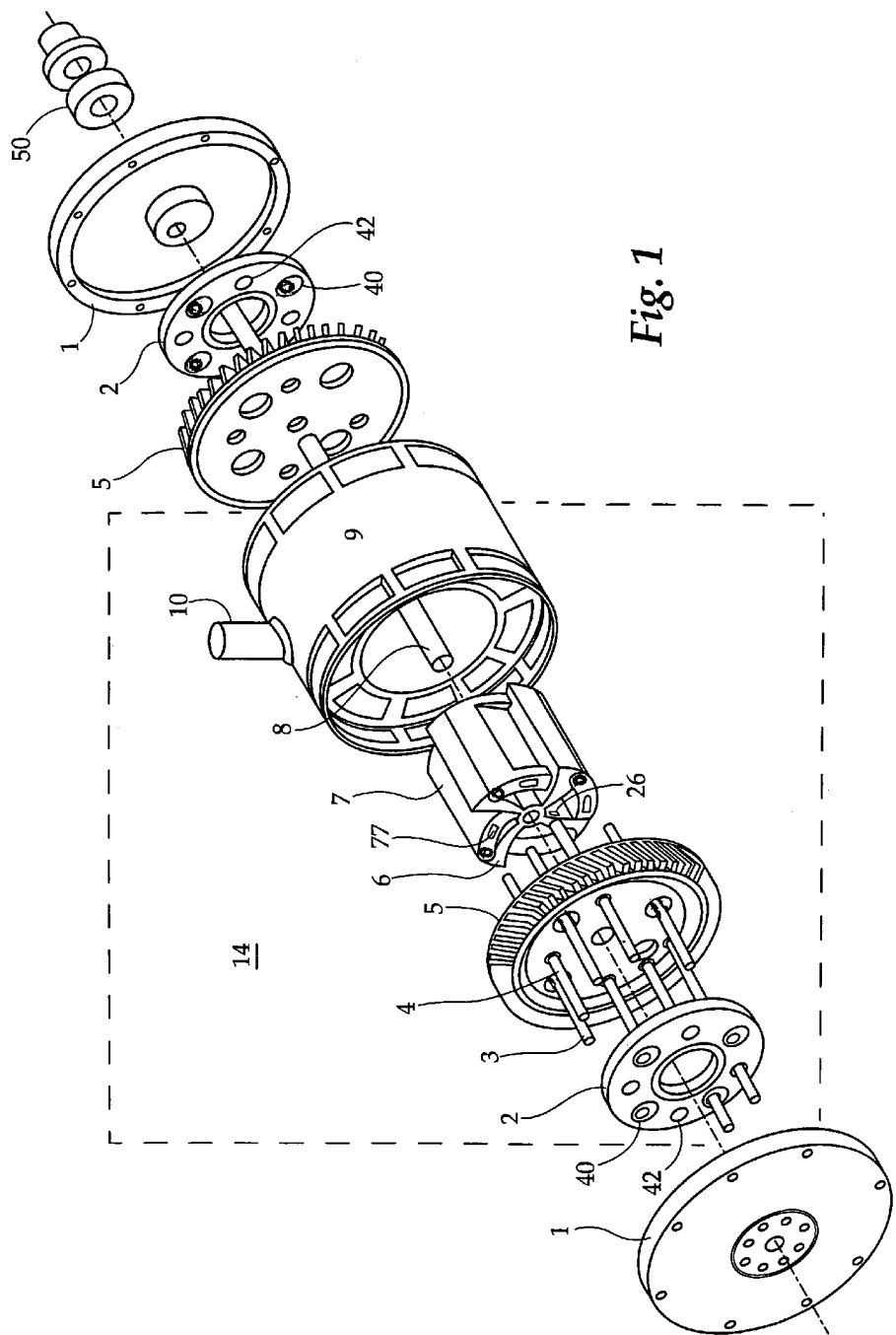
FIG. 1 is a pictorial view of a rotary engine modified in accordance with the teachings of the present invention.
Figure 1A:
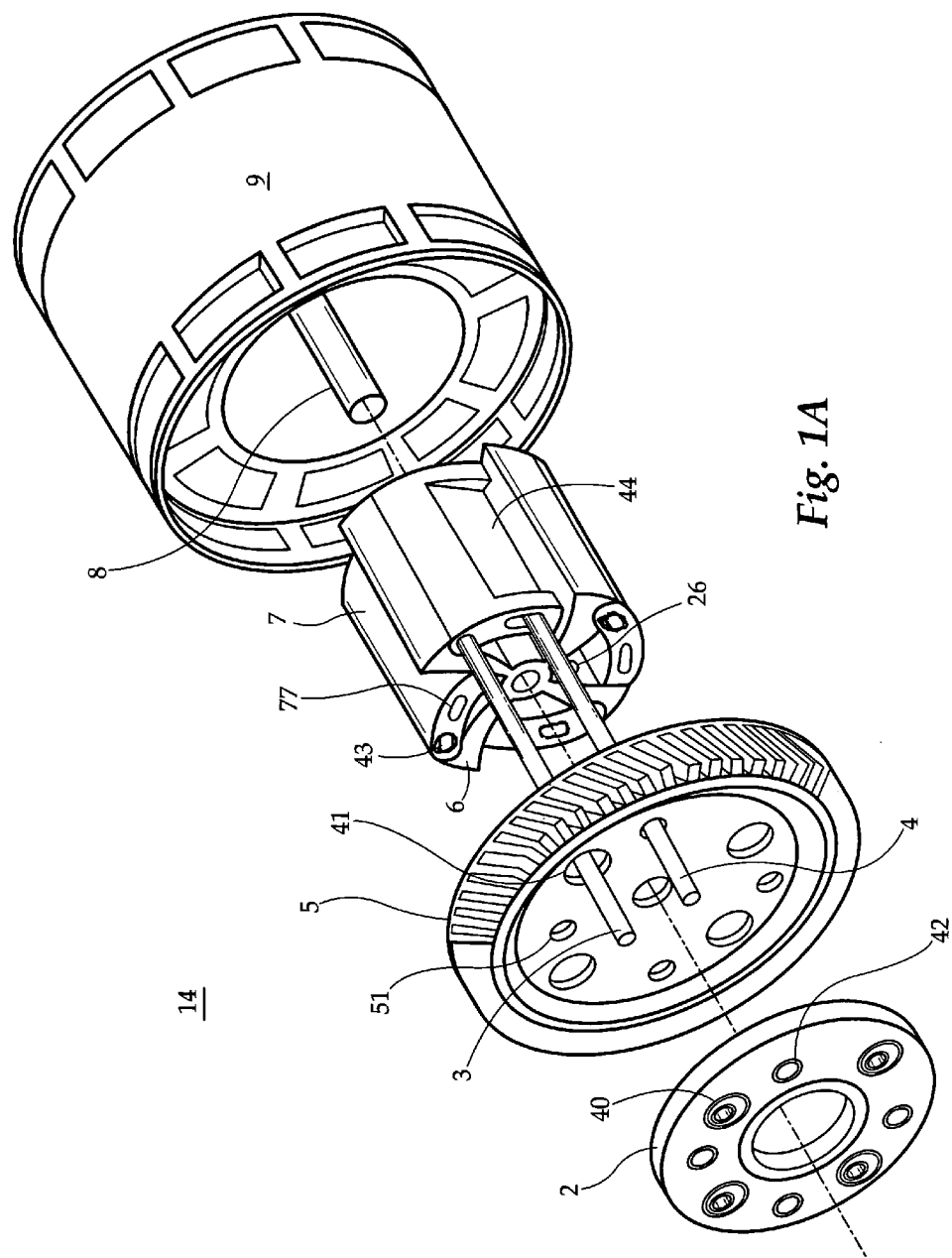
FIG. 1A is an enlarged view of area A of FIG. 1.
Figure 2:
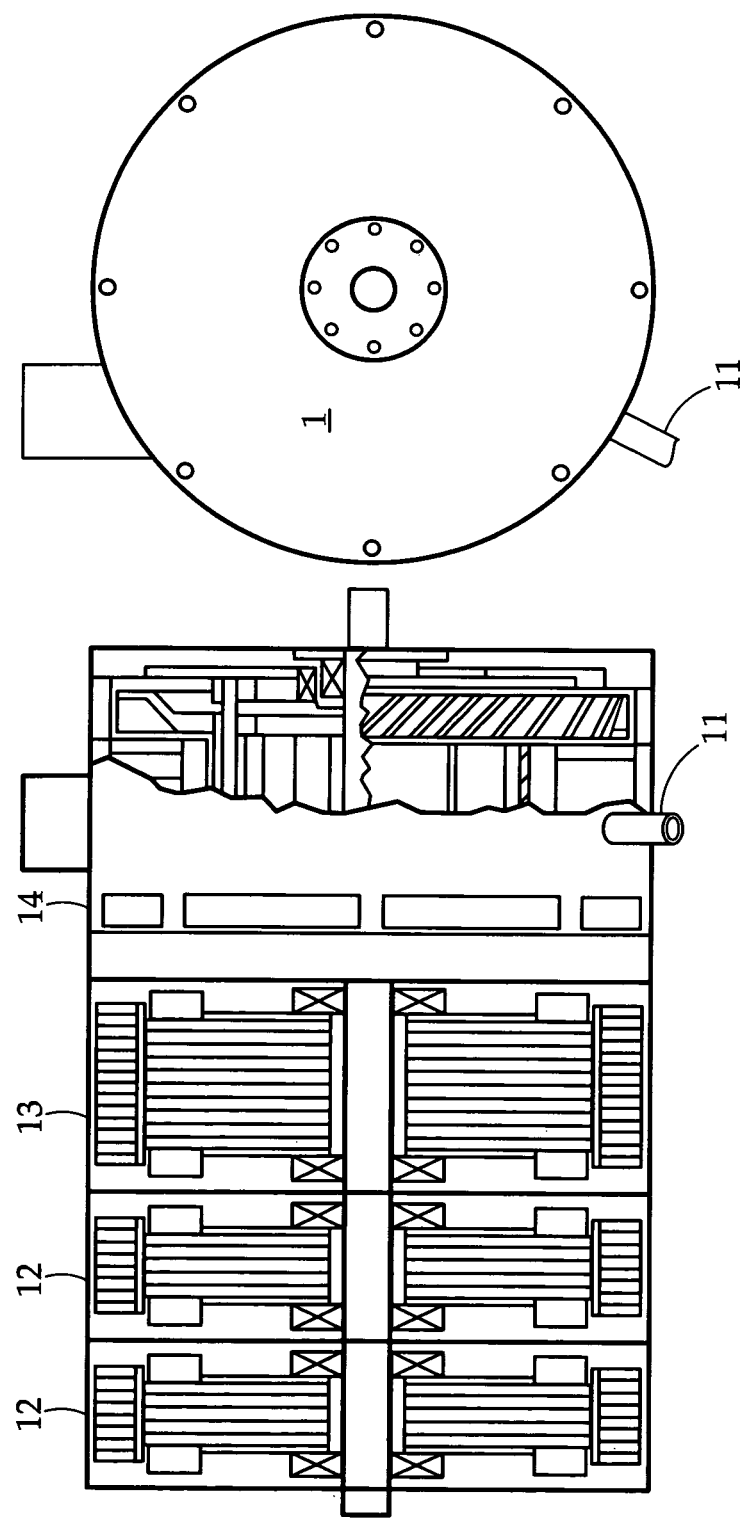
FIG. 2 is a cross-sectional view of the three elements which make up the drive system in a hybrid automobile embodying the invention, a set of generators, an electric motor, and the rotary engine of FIG. 1.

Referring to the exploded view of the rotary engine 14 of the invention illustrated in FIGS. 1 and 1A, reference numeral 1 identifies its housing end plate, reference numeral 2 identifies its actuators, reference numeral 3 depicts its fixed pins, and reference numeral 4 shows its actuating pins. The fan discs of the engine is shown at 5, the rotor core shown at 6, and the pivoting vanes are shown at 7, all riding on a shaft 8 extending through a T-ring housing 9. The exhaust outlet for the engine is then shown at 10.

The exploded assembly as illustrated in FIGS. 1 and 1A is housed within a T-ring housing 9. A spool-shaped rotor 6 is positioned on a shaft 8 within the T-ring housing 9. Spool-shaped rotor 6 has a central core about which are secured a plurality of vanes 7 which are pivotally mounted as more fully explained hereafter. Spool-shaped rotor 6 has a fan disk 5 secured to each end, the fan disk is similarly mounted on shaft 8. Mounted exteriorly of fan disk 5, is an actuator cage 2. The actuator cage 2 support two separate sets of pins 3 and 4. One set of pins 3, pass through double bearings 40 in actuator 2, and complimentary apertures 41 in fan disks 5, and are positioned within a thru bore 43 in each of the plurality of vanes 7 on rotor 6. These fixed pins 3 are the pivot point about which the vanes 7 pivot. The other set of pins 4, pass through single bearings 42 in actuator 2, and complimentary apertures 51 in fan disks 5 and are positioned through a slotted bore 77 in each of the plurality of vane 7 of rotor 6. As will be described more fully hereafter, the vane 7 pivots about fixed pin 3 and actuator pin 4 controls the amount of pivot and the timing of the pivot to control the stages of combustion in the rotary engine.

Each vane 7 is nested within the rotor core 6 and is automatically activated by the actuator pins 4 during each revolution of the rotor 6. Each vane 7 has a round pivot end accommodating fixed pins 3 and at its opposing end, a slot 77. Due to the eccentricity of the cage to the rotor, the fixed pin 3 is made to orbit within double bearings 40 while pivoting within its holding nest to produce a smooth, non-binding rotational path for the rotor. The actuator pin 4 spins on a set of single bearings 42 in order to effectuate a reciprocation of the vane once per revolution of the rotor by reciprocating within the slotted bore and imparting a smooth, non-binding rotational path for the rotor. This reciprocation of the actuator pin 4 sequentially causes the outer surface of the slotted end of the vane 7 to come in contact with the inner surface of the T-ring being pushed and held by the actuator pin to bring about the combustion cycle of the engine and to ultimately impart rotative forces to the drive shaft. The actuator pin then reciprocates within the slot, to disrupt contact with the inner surface of the T-ring housing 9 so as to effectuate the other cycles of the engine operation. It should be noted that the two opposing fan disks 5 act to condition and supercharge the incoming air directly into the T-ring housing in order to effectually purge and charge the intake portion of the engine cycle. Each vane 7 will be seen to have a fixed pin which supports its pivoting action, while at the same time stabilizes the rotary action of the rotor by terminating into the actuator through a double acting bearing. Each vane 7 also includes an actuator pin to provide a reciprocal action to each vane for each revolution. Each vane 7 is further formed with a wedge pocket 44 on its outer surface, this wedge pocket 44 defines the combustion pocket during the combustion stage. Each actuator pin 4 passes through a slot 77 in each vane 7 that allows the actuator pins to reciprocate within the vanes 7 once per revolution of the rotor. FIGS. 6 and 7 illustrate the relative location of the actuator pin 4 at each phase of engine operation.

Figure 3:
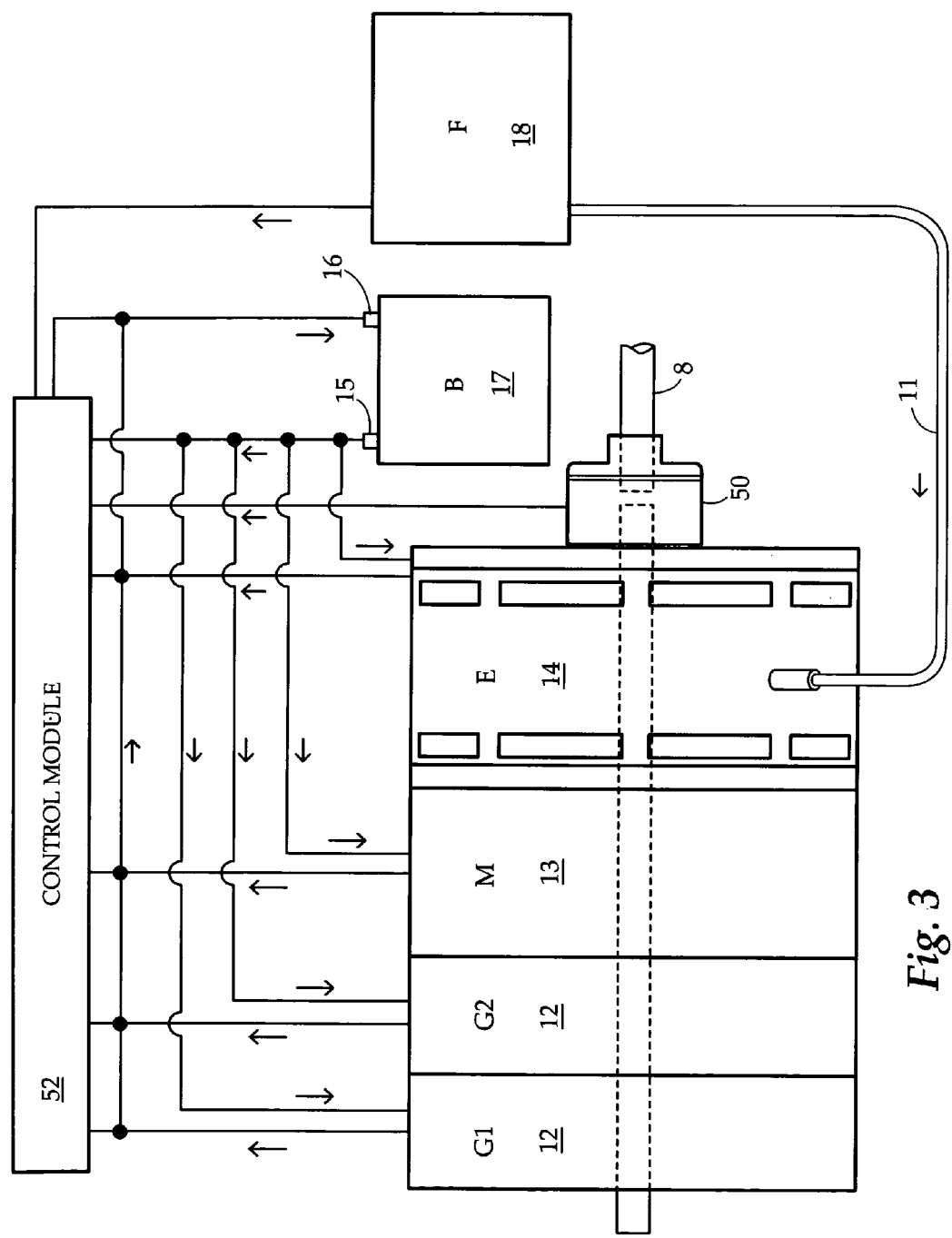
FIG. 3 is a diagrammatical view of the automotive drive system, including the battery bank and fuel tank, indicative of how they function together.

In the drive system illustrated in FIG. 3, electrical power from a battery bank 17 travels along a path 16 to the electric motor 13, whereas the generators 12 charges the battery bank 17 along a path 15, each as indicated in the direction of the arrows. A fuel tank 18 supplies gasoline or other fuel to the engine 14 along a fuel line 19 in the direction of its own respective arrow. A drive shaft sensor 50 is in communication with a control module 52 to monitor the electric motor 13 and engine 14 loads as more from discussed hereafter.

As will be appreciated by those skilled in the art, the cross-sectional view of rotary engine 14 (FIG. 4) includes a fuel injector 11, an actuator bearing 20, a rotor bearing 21, an eccentric 22, electric plug 12, a double bearing 40, pairs of fan seals 24, and single bearings 42. Reference numeral 8 continues to show the shaft of the rotary engine.

Figure 4:
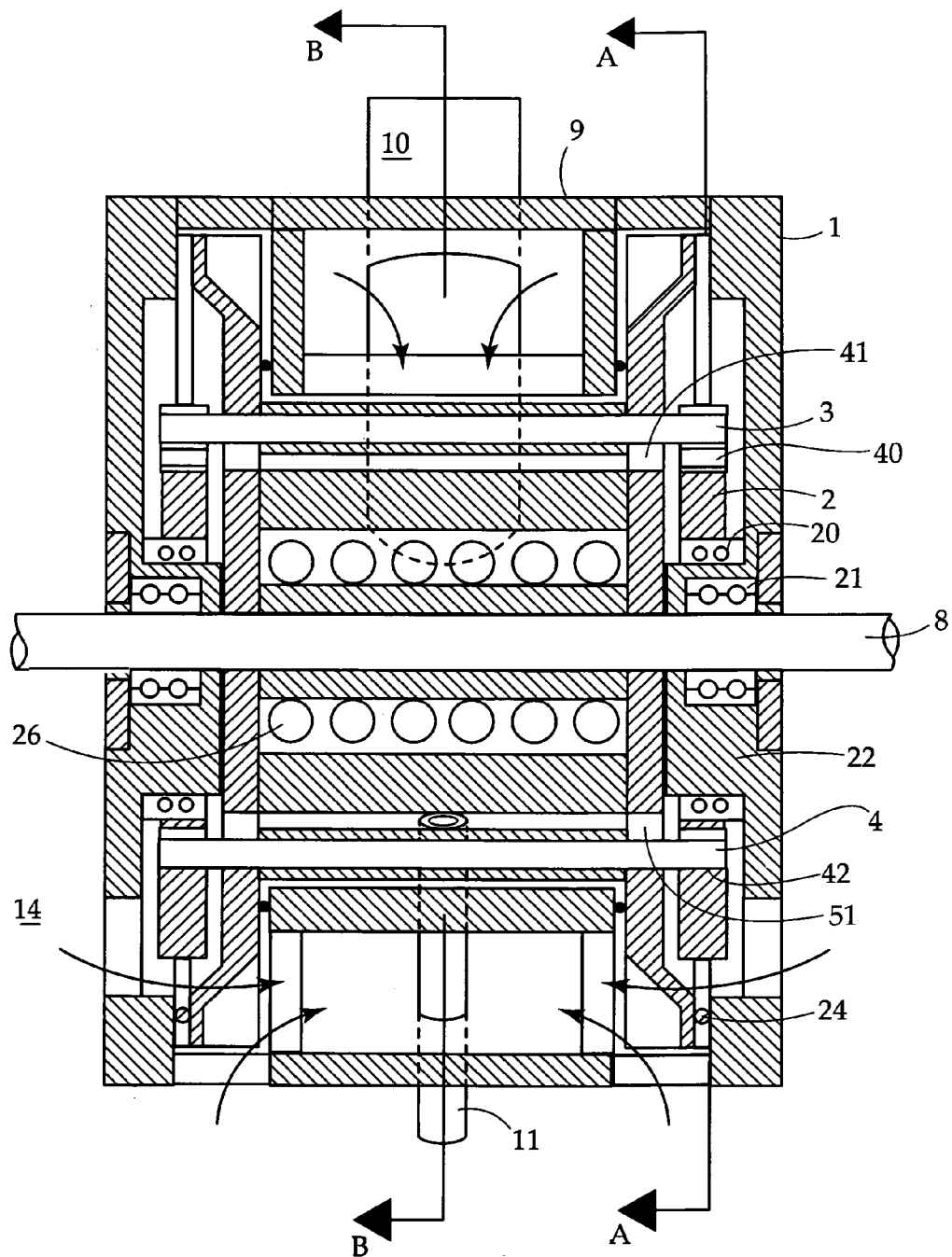
FIG. 4 is a cross-sectional view of the rotary engine of FIG. 1.
Figure 5:
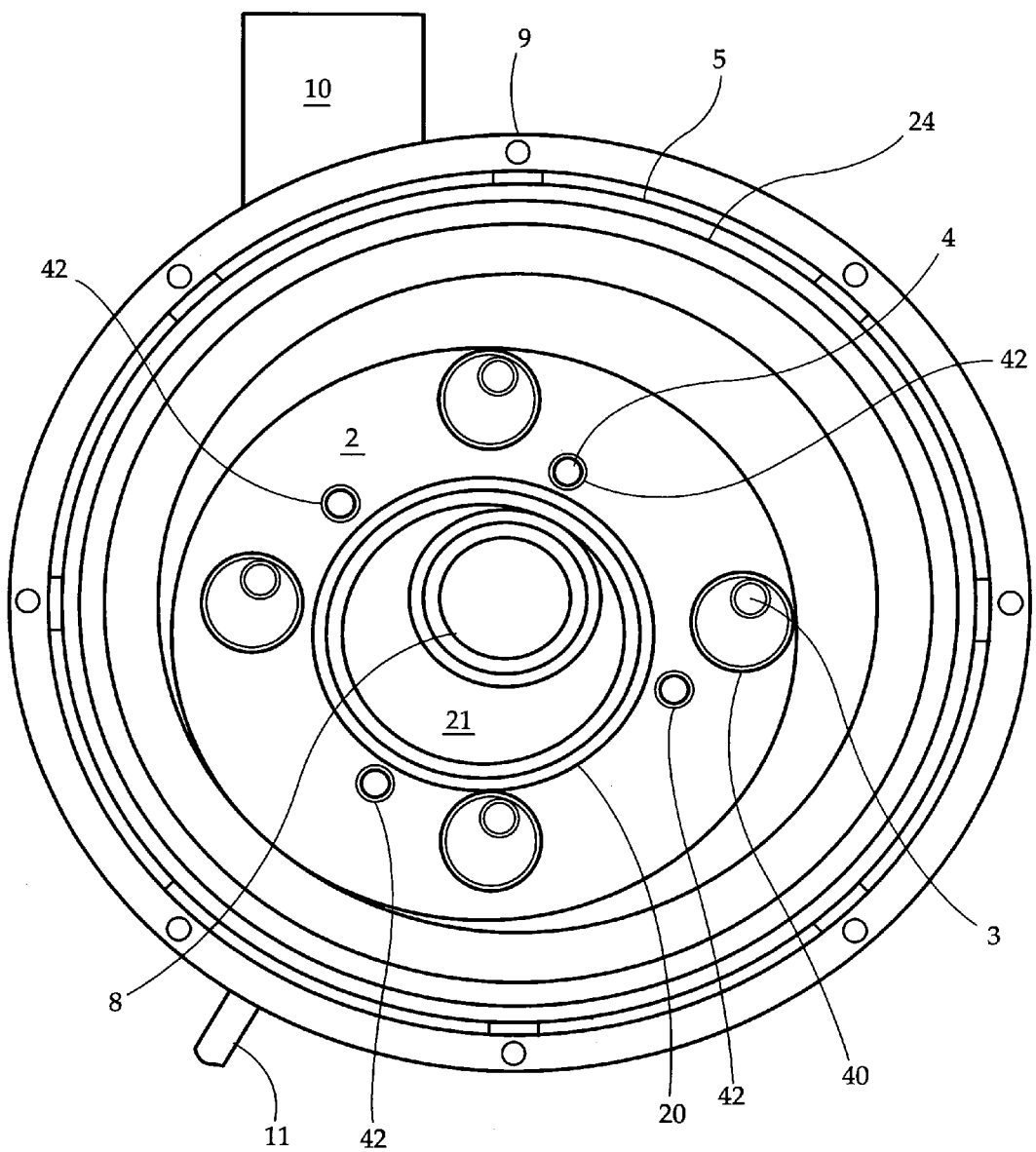
FIG. 5 is a sectional view of the rotary engine taken along its actuator.

FIG. 5 then shows a sectional view of the rotary engine of the invention taken at the actuator 2, along the plane A-A of FIG. 4. FIG. 6 shows a sectional view taken at the rotor 6 along the plane B-B of FIG. 4, with the four vanes 7 in their phases of intake, compression, combustion and exhaust, and while the intake vane is in the purging mode, and the combustion vane is at top dead center (TDC) and pressure transfer ports 26. FIG. 7 is a sectional view rotor 6 with intake at bottom dead center (BDC). Reference numeral 28 identifies the intake at the purge position, with the compression, combustion and power phases indicated clockwise. The "fuel" and "air" inputs are as indicated with the notation BDC representing the bottom dead center position. FIG. 7, on the other hand, shows the same section view at the rotor 6 along the line B-B with intake vane at the bottom dead center (BDC) position and the combustion vane proceeding through the power phase. The intake vane at the bottom dead center position (BDC) is shown at 28.

Figure 8:
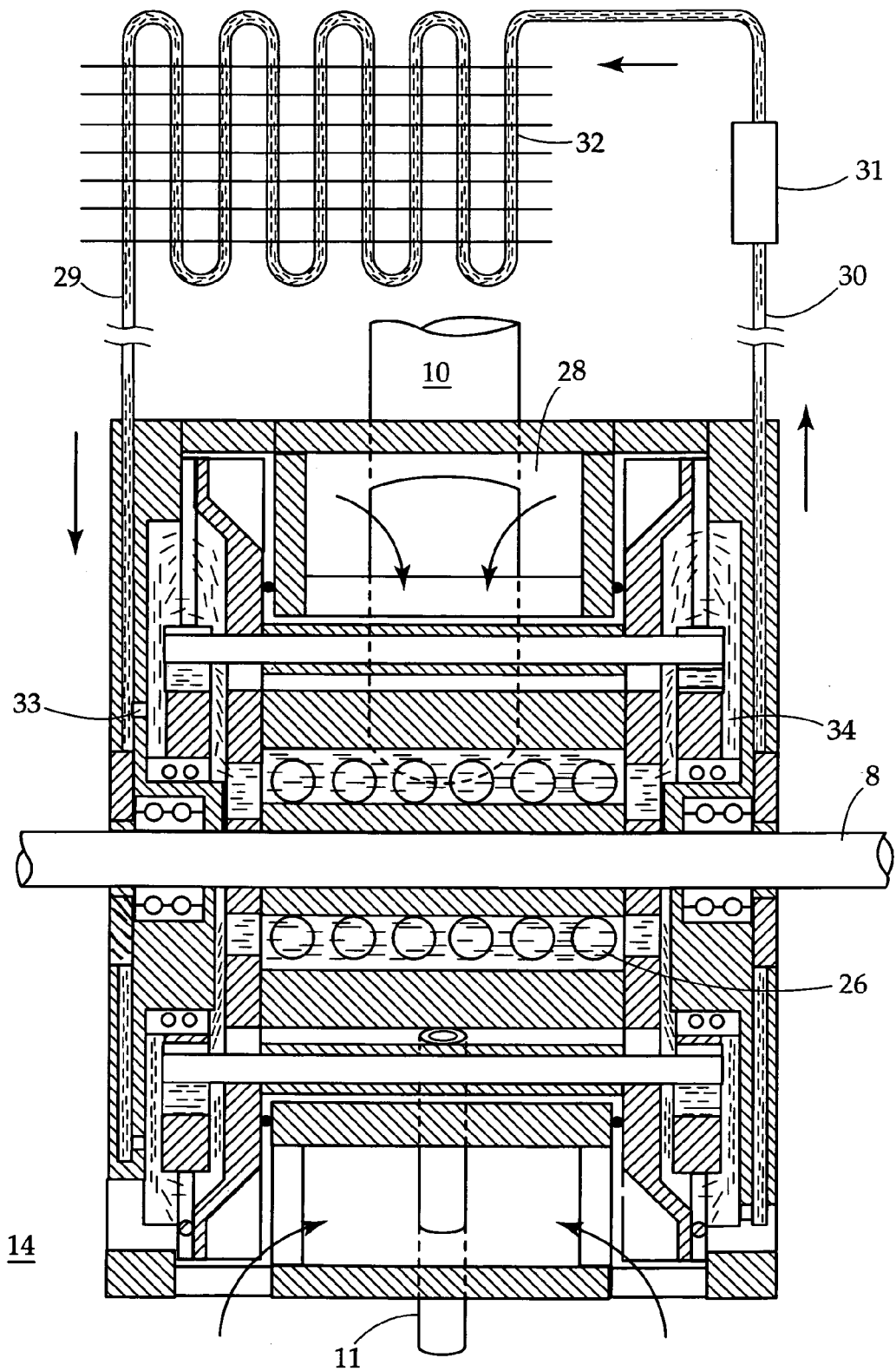
FIG. 8 shows a combined cooling and lubricating system for the rotary engine of FIG. 1.

Adding the cooling and lubricating system with the rotary engine of FIG. 4 provides the view of FIG. 8 in which reference numeral 29 identifies the oil inlet, reference numeral 30 identifies the oil outlet, the filter is shown at 31, the heat exchange is shown at 32, and its "in" and "out" pumps shown at 33 and 34 respectively. Again the various arrows signify the flow of the coolant gases and lubricating fluids in typical fashion.

In operation, the rotor through supercharging by way of the rotor fan discs, undergoes the normal four stages of intake, compression, combustion and exhaust during each revolution. A cross over scavenging of the exhaust gases prior to full intake initiates the intake stage, as shown in FIG. 6. The combustion stage can be spark or diesel generated in the absence of intake and exhaust valves aids dramatically in simplifying the sequence while improving efficiency. This joined together with the absence of any stop motion at the top dead center and bottom dead center further improves the efficiency. As will be understood, in the operation of the hybrid engine, the generators 12 constantly charges the batteries of the bank 17 while increasing revolutions during moments of deceleration increase the charging to the batteries and the braking forces to the drive shaft.

The objective is to produce a constant flow of energy from a source that in the past has been totally wasted. The rotation of the wheels on the vehicle in touch with the road surface generates a definite but dissimilar signal during acceleration, deceleration, and cruising. A control module 52 via the drive shaft sensor 50 determines which of the two drive elements, electric motor or engine, are to be the primary driver. The contributing elements to this are between the degree of fuel and battery charge. These energy forces are easily detected by a drive shaft sensor on the drive shaft and transmitted to a control module. The control module would communicate with the set of sequencing generators in communication with the drive shaft, the activation of which by the control module creates resistance to the drive shaft while simultaneously charging the batteries and results in a smooth braking. Since the generators were operation in sequence, the second generator would develop higher charging and braking than the first.

The electric motor 13 always assists the engine 14 primarily during the acceleration, but at the same time is always sensing the drive shaft load to react on demand. The generators are in effect a preliminary braking system apart from the separate and dedicated electric brake module, which is connected solely to the drive shaft. This generator arrangement allows the system to automatically and frequently charge without the vehicle operator's assistance. This is possible due to an intermediate faster charging element with a slightly higher storage density than an ordinary capacitor which would allow for a quick charge while operating, and which can be instantly transmitted to the electric motor requiring minimal long term battery storage.

As the rotary engine requires less combustion forces to achieve vehicle power of the standard piston action because the spinning rotor mass develops power through kinetic energy forces much in the way the electric motor operates, the efficiency of the rotary engine in this invention would be much higher than with standard piston engine, which begins at 50 percent. With the modification to the vanes to provide enhanced displacement, a more stable operation is realized in a smaller package. Because of the elimination of the previously utilized piston arms and their inherent side loading.

Assuming the rotary engine efficiency at 100 percent as compared to standard engines, this engine would provide a larger horse power within an envelope substantially smaller than the conventional engine. The rotary engine coupled to the motor and generator would continue to be substantially smaller than a standard four cylinder stand alone engine. The absence of valves for the intake and exhaust will be understood to allow greater efficiency at higher revolutions, eliminating the parts and timing problems associated with conventional engines.

While the present invention has been described with respect to the preferred embodiments thereof, it will be readily appreciated by those of ordinary skill in the art that modifications can be made without departing from the scope and teachings herein. Therefore it is intended that the application and invention be limited only by the scope of the claims and the equivalence thereof.

I claim:

1. A hybrid engine including a set of electric generators, an electric motor, and a rotary internal combustion engine, the rotary internal combustion engine comprising a cylindrical housing having an annular intermediate member defining an enclosed rotor chamber, a rotor positioned in said rotor chamber, a pair of end plates, a pair of actuators journaled to one each of an internal surface to the actuator hub of each of said end plates, a pair of fan disks journaled one each on an internal surface of said actuators, a shaft journaled in said end plates and extending through said actuators and said fan disks and said chamber fixed to said rotor, pivotal vanes on said rotor, said pivotal vanes biased in engagement with said annular member forming intake, compression, combustion, and exhaust chambers in said rotor chamber, an intake passageway in said housing to admit air to said intake chamber, power means on said rotor for forcing said vanes into engagement with said annular wall comprising radially extending slots in said rotor, an exhaust passageway for exhausting said spent gas from said combustion chamber when pivoting said vanes outwardly, a drive shaft sensor, mounted on said shaft journaled in said end plates, said drive shaft sensor responsive to reading and measuring the angular forces of said shaft, said drive shaft sensor in communication with a control module, said control module in communication with said electric motor and said rotary internal combustion engine for controlling their respective output to said shaft journaled in said end plates.

2. The hybrid engine in accordance with the teachings of claim 1 further including a plurality of fixed and actuating pins, said fixed pins positioned within a bore on said pivotal vanes, said actuating pins positioned within slots on said vanes, set fixed pins and actuator pins extending through said fan disk and to actuators positioned on said end plates.

3. The hybrid engine in accordance with the teachings of claim 2 wherein each of said fixed pins couples into said actuator through a double acting bearing.

4. The hybrid engine in accordance with claim 2 wherein each of said actuating pins is coupled to provide reciprocating action to each said vane for each rotary revolution.

5. The hybrid engine in accordance with claim 2 wherein said rotor is provided with recesses in the periphery thereof for receiving said pivoting vanes.

6. The hybrid engine in accordance with claim 1 wherein a battery pack coupled with a set of sequencing generators and a drive shaft coupled with said rotor wherein said generators constantly charges said battery pack while increasing the charge thereto during moments of vehicle deceleration.

\* \* \* \* \*